March 6, 1951     J. J. JENNEN ET AL     2,544,322
SENSITIZED PHOTOGRAPHIC EMULSIONS
Filed May 17, 1940
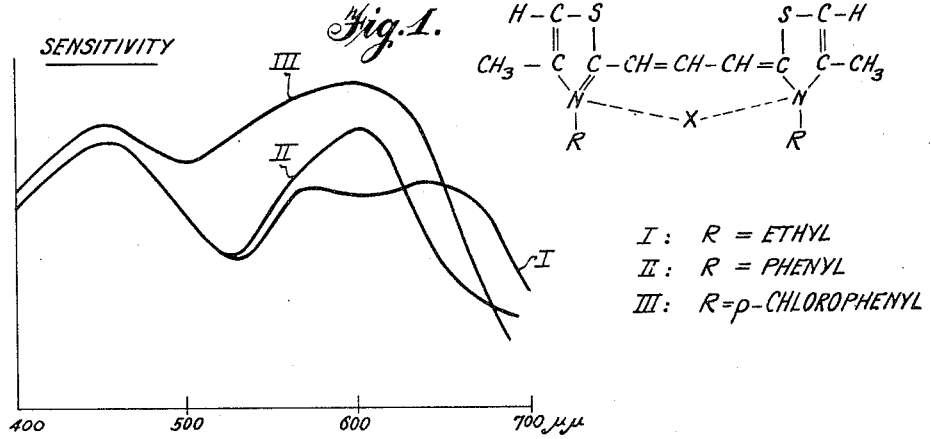
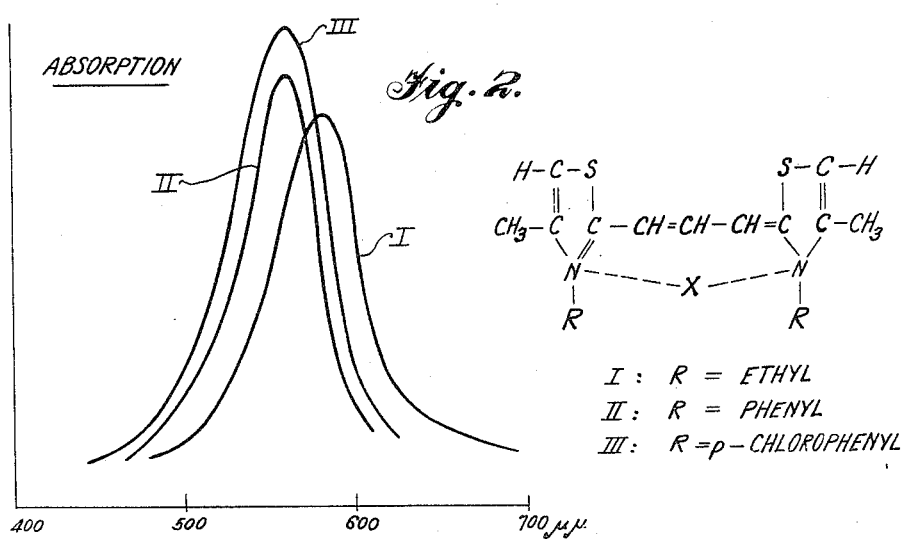
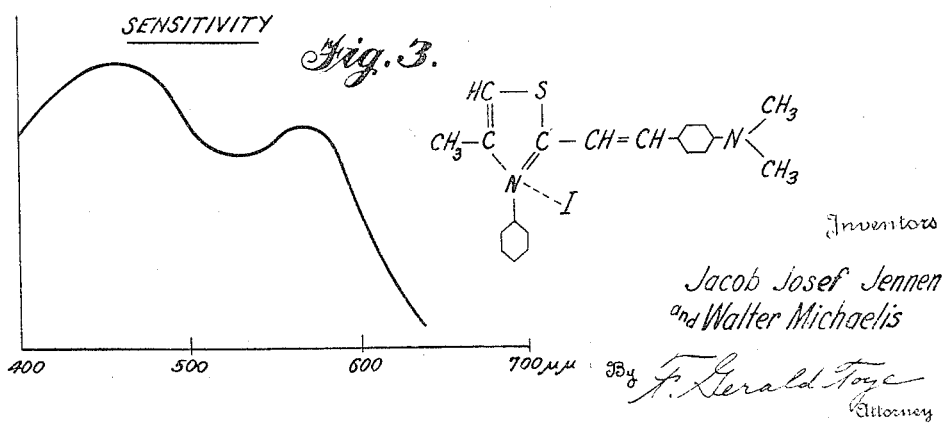
Inventors
Jacob Josef Jennen
and Walter Michaelis
By F. Gerald Toye
Attorney Patented Mar. 6, 1951

2,544,322

UNITED STATES PATENT OFFICE 2,544,322

SENSITIZED PHOTOGRAPHIC EMULSIONS

Jacob Josef Jennen, Dilsen, and Walter Michaelis, Brussels, Belgium, assignors, by mesne assignments, to Bela Gaspar, Beverly Hills, Calif.

Application May 17, 1940, Serial No. 335,854
In Great Britain April 24, 1939

15 Claims. (Cl. 95—7)

The present invention relates to dyes and photographic materials containing dyes belonging to the class of methine and polymethine dyes and dyes of similar structure and more particularly to dyes which are useful as sensitizers for photographic silver halide emulsions. These dyes are widely employed in the art of photography and color photography and a great number of cyanine dyes, isocyanine dyes, pseudocyanine dyes, carbocyanine dyes and polymethine dyes having longer methine chains are already known. These dyes are quaternary salts derived from cyclic ammonium bases in which there is a pentavalent nitrogen atom single bound to one neighbouring ring atom and double bound to the other neighbouring ring atom of a heterocyclic ring whilst the fourth valency of the same nitrogen atom is linked to a hydrocarbon radical, the fifth valency of the nitrogen atom being in ionogene linkage with an anion.

The present invention relates to the manufacture of methine dyes and polymethine dyes in which the heterocyclic ring includes both a nitrogen atom and another hetero-atom such as sulphur and in which a valency of the nitrogen atom is linked not to an aliphatic but to a substituent cyclic carbon atom and more particularly to photographic silver halide emulsions sensitized with such dye or dyes. Whereas the formulae of sensitizing dyes have been drafted sometimes broad enough to include a cyclic substituent at the nitrogen atom, it does not appear that those dyes and more particularly sensitizing thiazole dyes carrying such substituents have been prepared or used in light-sensitive emulsions. The dyes can be prepared by treating N-arylated quaternary salts of a hetero-cyclic nitrogen base, the ring atom of which includes another hetero atom such as sulphur and which carries a methyl group in ortho position to the cyclic nitrogen atom (or the corresponding methylene bases) by the methods known to be capable of converting hetero-cyclic nitrogen bases containing a reactive methyl group in $\alpha$-position to a cyclic nitrogen atom (or the corresponding methylene bases) into dyes of the following general formula:

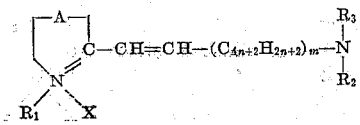

in which the hydrogen atoms may be substituted.
In the above formula:

A is a hetero atom other than a nitrogen atom in an atom chain of a ring system;
$R_1$ is a hydrocarbon radical;
X is an anion;
$n$ is zero and $m$ is zero, 1, 2 or 3; or $n$ and $m$ are 1;
$R_2$ is a hydrocarbon radical;
$R_3$ is a hydrocarbon radical, an atom chain including three atoms which close a 5-membered hetero ring with a carbon atom of the chain of carbon atoms between the two nitrogen atoms, or an atom chain including two or four atoms which close a 6-membered hetero ring with a carbon atom of the chain of carbon atoms between the two nitrogen atoms, so as to form a dye having two heterocyclic nitrogen compounds linked by an odd number of carbon atoms. The general formula may also be represented in its tautomeric form

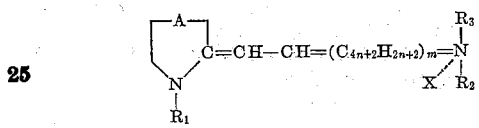

as indicated graphically in the examples.

In the following examples, some of the known methods for producing dyes of the above general formula are applied to the treatment of the N-arylated quaternary salts, the term "N-arylated quaternary salts" being intended to include also compounds in which cyclic radicals other than aromatic aryl radicals are linked to the nitrogen atom.

*Example 1.*—1 gram of 2.4-dimethyl-3-phenyl-thiazolium iodide (prepared according to the Journal of the American Chemical Society, 1935, page 1881, or to Berichte der Deutschen Chemischen Gesellschaft, vol. 69/1, page 221) and .5 grm. of p-dimethylaminobenzaldehyde is dissolved by warming in 7 ccs. of ethyl alcohol. .17 grm. of piperidine is then added, and the mixture is refluxed for an hour.

After cooling, ether is added, and thereupon an orange-red dye separates out, which is dissolved by heating in a little ethyl alcohol. On cooling this solution, crystals with greenish lustre are formed. The dye, dissolved in water with the addition of a small quantity of methyl alcohol has an absorption maximum at about 485$\mu\mu$.

Its formula is probably that of the 2-dimethyl-aminostyryl - 3 - phenyl-4-methyl-thiazolium iodide:

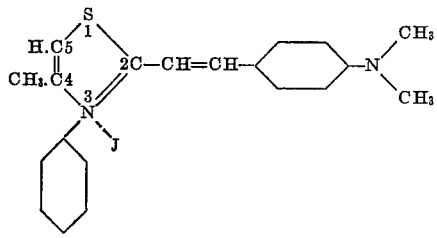

A silver halide emulsion layer is sensitized to green light by the addition of the dye and then shows a maximum of sensitivity at about 450μμ and another maximum at about 540μμ.

Example 2.—3 grms. of the 2.4-dimethyl-N-phenyl-thiazolium iodide are heated with 3 grms. of N-methyl-α-thioquinolone-methyl-iodide and 30 ccs. of dry pyridine in an oil bath at 120° C. for 1½ hours. The addition of water to the cooled mixture results in the precipitation of a dye, having an absorption maximum in a methyl-alcoholic solution at about 482μμ. Its formula is probably that of the 1'-methyl-3-phenyl-4-methyl-thiazolo-pseudo-cyanine iodide:

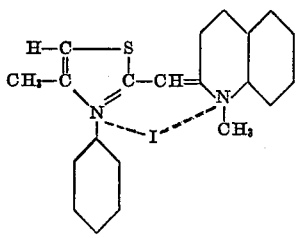

Example 3.—3 grms. of the 2.4-dimethyl-3-phenyl-thiazolium iodide and 40 ccs. of dry pyridine are refluxed 1½ hours together with 5 ccs. ethyl-ortho-acetate. The addition of ether causes the precipitation of a magenta dye, crystallizable from ethyl alcohol, and having in methyl alcoholic solution an absorption maximum at about 548μμ. Its formula is probably that of the 3.3-diphenyl-4.4'-7-trimethyl-thiazolo-carbocyanine iodide:

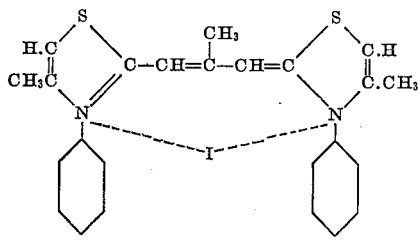

Example 4.—4 ccs. of dry pyridine, .3 grm. of 2.4-dimethyl-3-phenyl-thiazolium iodide and .5 cc. of orthoformic acid ethyl ester are heated at about 120° C. for about two hours. A magenta dye is obtained which can be precipitated from the solution by the addition of ether. The dye is probably the 3.3'-diphenyl-4.4'-dimethyl-thiazolo carbocyanine iodide of the formula:

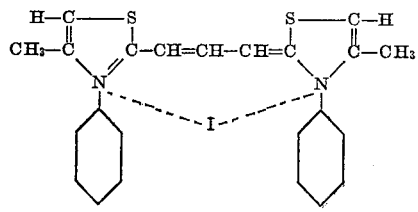

Absorption (maximum) in methyl-alcoholic solution ca. 560μμ.

Example 5.—3 grms. of dry p-chloro-thioacetanilide and 3 ccs. of chloroacetone are heated for about 10 minutes on a water bath. 50 ccs. ether are then added to the mixture and the whole is allowed to stand for several hours. The ether is decanted and the excess of chloro-acetone is removed by washing with ether. The raw product is heated for about 8 hours with 4.4 grms. ethyl toluenesulphonate and dissolved thereafter in 10 ccs. of dry pyridine. This solution is boiled with 3 ccs. orthoformic acid ethyl ester for about 45 minutes; after the addition of ether the solution is allowed to stand for several hours, preferably at 0° C. The liquid is decanted and the residue dissolved in methanol and precipitated again with ether. This may be done several times, whereafter the product is boiled with water and filtered. Green crystals of a metallic lustre are obtained, which are believed to be the 3.3'-di-(p-chlorophenyl) - 4.4'-dimethyl-thiazolocarbocyanine toluene-sulphonate of the formula:

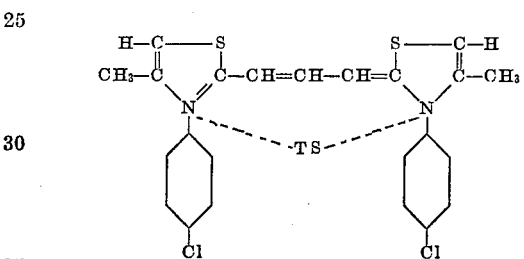

Absorption in methylalcoholic solution ca. 560μμ (max.).

Example 6.—In the foregoing examples the thiazol ring or rings in the resulting dyes are of the simple thiazole type void of ortho condensed rings. A benzothiazolium cyanine dye may be prepared as follows: 12.5 grms. acetyl-diphenylamine are dissolved in 50 ccs. pyridine, 6 grms. phosphorus pentasulphide are added and the whole is stirred for 12 hours at 110° C. The upper light yellow layer is decanted off and the thioamide contained therein is precipitated with hydrochloric acid, filtered off by suction and recrystallised from alcohol. The compound which has a melting point of 112° C. is identical with the thioacetyl diphenylamine prepared by Bernthsen from carbon disulphide and diphenyl acetamidine (Annalen der Chemie, vol. 192, page 39).

6.8 grms. of the thioacetyl diphenylamine (N,N diphenylthioacetamide) thus obtained are dissolved in 30 ccs. chloroform and a solution of 4.8 grms. bromine in 10 ccs. chloroform is added in drops, the whole being cooled during this operation. The light yellow color of the solution changes to a dark brown and meanwhile hydrobromic acid is formed. After the mixture has been allowed to stand for two hours the chloroform is distilled off. The base is dissolved in acetone, freed of an undissolved grey powder by filtering off this by-product; and the acetone is evaporated. A brown oil remains and this is dissolved in 50 ccs. acetic anhydride. Thereupon, 5 ccs. triethyl-ortho-formate are added and the whole is refluxed for 20 minutes. After cooling, 500 ccs. diethyl ether are added, the solution is kept in ice water for about 12 hours and then the precipitated dye is filtered off and washed with ether. It is believed to be 2.2'- diphenyl-thio-carbo-cyanine acetate and the reaction is believed to proceed as follows:

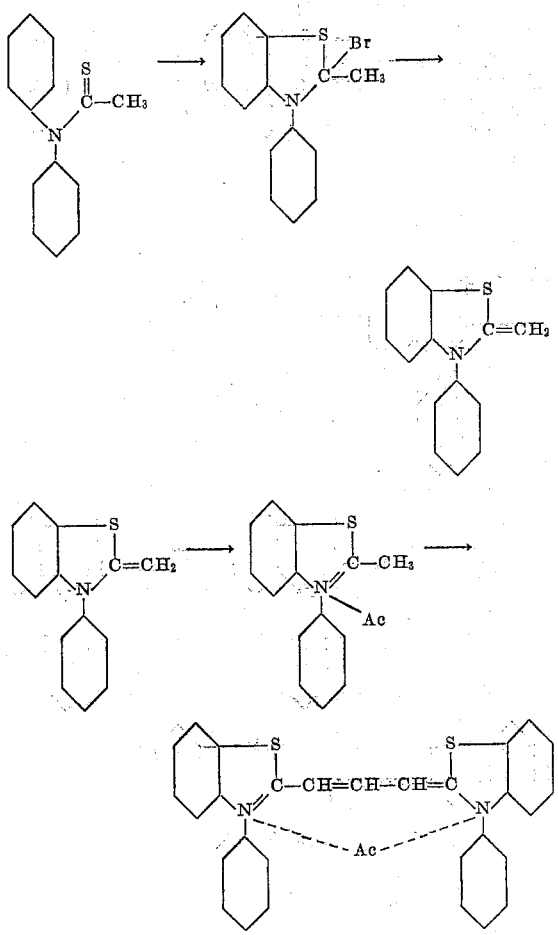

The dye is purified by being dissolved in methyl alcohol and is thereafter converted into the iodide by the addition of a warm 10% potassium iodide solution. The formula of the final dye, whose solution in methyl alcohol shows a maximum absorption at about 565μμ is believed to be 3.3'-diphenyl-dibenzothiazole carbocyanine iodide of the formula:

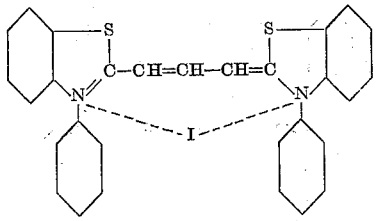

As will be seen from the above formulae the nitrogen atom in at least one of the heterocyclic rings of the dye molecule is linked to a phenyl group. By the use of appropriate starting materials, such as the N-thio-acetyl compounds derived from naphthylamine, p-iodoaniline, amino-pyridine first converted by condensation with chloro-acetone into N-substituted 2.4-dimethyl-thiazolium salts and by using these compounds in the process instead of 2.4-dimethyl-N-phenyl-thiazolium iodide employed in the above examples, there are obtained dyes that contain various cyclic radicals, substituted or unsubstituted, linked to the nitrogen atom of the hetero-cyclic ring.

It will be understood that instead of the symmetrical carbocyanine dyes unsymmetrical dyes may be prepared and it should further be understood that the reference to certain dyes in the examples is not intended to exclude similar dyes, such as isocyanine dyes, merocyanine dyes and polymethine dyes having a longer polymethine chain. Merocyanine dyes may be prepared, for example, by refluxing for about 20 minutes a solution of .96 grm. 2.4-dimethyl-3-phenyl-thiazolium iodide and .45 grm. diphenyl-formamidine in 5 ccs. acetic anhydride, separating the 2-acetanilidovinyl-3-phenyl-4-methyl thiazolium iodide from the cooled solution and condensing the product with rhodanines, pyrazolones and the like as follows: A solution of .17 grm. acetanilidovinyl - phenyl - methyl thiazolium iodide and .08 grm. 3-phenyl-rhodanine in 2 ccs. absolute ethylalcohol to which about .1 cc. triethylamine has been added, is refluxed for about 20 minutes and then kept for several hours at a temperature of 0° C. The crystals of the dye formed are washed with ether. The dye which is believed to be the 3-phenyl-5 (3-phenyl-4-methyl - 2 - thiazolylidene - ethylidene) rhodanine has its absorption maximum at about 530μμ. If instead of the phenyl-rhodanine .07 grm. 1-phenyl-3-methyl-pyrazolone-(5) is used a dye is obtained which is precipitated from the solution by ether and which is washed with ether. The dye which is believed to be the 3-methyl-1-phenyl - 4 - (3 - phenyl - 4 - methyl - 2 - thiazolylidene-ethylidene) pyrazolone - (5) has its absorption maximum at about 480μμ.

The dyes may be incorporated in a silver halide gelatin emulsion by bathing the emulsion coating in an alcoholic or aqueous alcoholic dye solution. Or the dyes may be incorporated in the emulsion, preferably into the finished emulsion before coating the same on the plate, film, paper or other support. For example, to a silver bromide-iodide gelatin emulsion which has a silver content corresponding to 60 grms. silver nitrate per kilo emulsion and which has a speed of about 29° Sch. there is added a 1% ethylalcoholic solution of the sensitizing dye. 20 ccs. dye solution per kilo emulsion are used. The emulsions are then coated.

The sensitizing effect of the dyes is illustrated by the spectrograms of the accompanying drawing. In Fig. 1 the spectrograms of two dyes which carry a cyclic substituent at the nitrogen atom and which are prepared according to the preceding Examples 4 and 5 are shown in comparison with the spectrogram of the corresponding N-alkyl compound. In Fig. 2 the absorption curves of these three dyes are shown. Fig. 3 shows the spectrogram of another N-arylated dye, prepared as described in Example 1. Fig. 1 illustrates the improvements obtainable by the introduction of a cyclic substituent into the dye molecule and the effect of substituents, such as chlorine, present in said cyclic radical. The choice of suitable substituents does not offer particular difficulties, as the more or less favorable influence on the sensitizing properties is, in general, known for the substituents usually employed.

A polymethine dye having a polymethine chain including more than three carbon atoms may be prepared by heating for about 5 minutes, .32 grm. 2.4-dimethyl-3-phenyl-thiazolium iodide with .14 grm. glutaconic dialdehyde dianilide and .22 cc. triethylamine in 4 ccs. absolute ethylalcohol, until the solution has become bluegreen. The dye crystallizes from the solution kept at low temperature for several hours.

This application is a continuation-in-part of application Serial No. 331,462, filed April 24, 1940, now abandoned.

The novel N-aryl quaternary salts and novel method of making such salts as herein disclosed having been claimed in our copending application Serial No. 532,694, filed April 25, 1944, now Patent No. 2,495,260, no claim is herein made to such salts or such method. Similarly the novel N-aryl thiazolium and thiazolylidene dyes as disclosed herein having been claimed in our copending application Serial No. 152,504, filed March 28, 1950, no claim is herein made to such dyes per se.

We claim:

1. A photographic silver halide emulsion comprising a sensitizing dye which is selected from the group of sensitizing thiazolium dyes which have a phenyl radical directly linked to the quaternary nitrogen atom of the thiazolium ring.

2. A photographic material comprising a silver halide emulsion containing a dyestuff serving to sensitize said silver halide emulsion corresponding with the formula

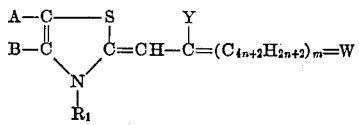

wherein

A and B stand for hydrogen, alkyl or the carbon atoms to complete an aromatic ring;
$R_1$ stands for an aryl radical;
$n$ stands for an integer selected from the group consisting of 0 and 1;
$m$ stands for an integer selected from the group consisting of 0, 1, 2 and 3;
Y stands for a member selected from the group consisting of hydrogen and alkyl;
W stands for a radical selected from the group consisting of

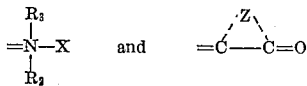

in which

X stands for an anion;
$R_2$ stands for a hydrocarbon radical;
$R_3$ stands for a member selected from the group consisting of hydrocarbon radicals, an atom chain including three atoms which serve to complete a 5-membered hetero ring with at least one carbon atom of the chain of carbon atoms between the two nitrogen atoms, and an atom chain including two or four atoms which serve to complete a 6-membered hetero ring with at least one carbon atom of the chain of carbon atoms between the two nitrogen atoms; and
Z stands for the atoms which serve to complete a heterocyclic radical.

3. A photographic material comprising a silver halide emulsion containing a dyestuff serving to sensitize said silver halide emulsion corresponding with the formula

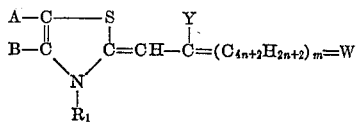

wherein

A and B stand for hydrogen, alkyl or the carbon atoms to complete an aromatic ring;
$R_1$ stands for a phenyl radical;
$n$ stands for an integer selected from the group consisting of 0 and 1;
$m$ stands for an integer selected from the group consisting of 0, 1, 2 and 3;
Y stands for a member selected from the group consisting of hydrogen and alkyl;
W stands for a radical selected from the group consisting of

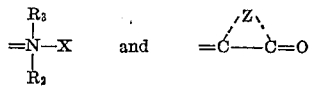

in which

X stands for an anion;
$R_2$ stands for a hydrocarbon radical;
$R_3$ stands for a member selected from the group consisting of hydrocarbon radicals, an atom chain including three atoms which serve to complete a 5-membered hetero ring with at least one carbon atom of the chain of carbon atoms between the two nitrogen atoms, and an atom chain including two or four atoms which serve to complete a 6-membered hetero ring with at least one carbon atom of the chain of carbon atoms between the two nitrogen atoms; and
Z stands for the atoms which serve to complete a heterocyclic radical.

4. A photographic material comprising a silver halide emulsion containing a dyestuff serving to sensitize said silver halide emulsion corresponding with the formula

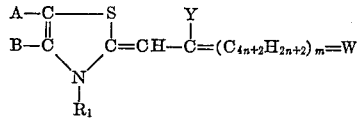

wherein

A and B stand for hydrogen, alkyl or the carbon atoms to complete an aromatic ring;
$R_1$ stands for a halogenated phenyl radical;
$n$ stands for an integer selected from the group consisting of 0 and 1;
$m$ stands for an integer selected from the group consisting of 0, 1, 2 and 3;
Y stands for a member selected from the group consisting of hydrogen and alkyl;
W stands for a radical selected from the group consisting of

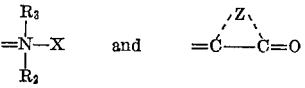

in which

X stands for an anion;
$R_2$ stands for a hydrocarbon radical;
$R_3$ stands for a member selected from the group consisting of hydrocarbon radicals, an atom chain including three atoms which serve to complete a 5-membered hetero ring with at least one carbon atom of the chain of carbon atoms between the two nitrogen atoms, and an atom chain including two or four atoms which serve to complete a 6-membered hetero ring with at least one carbon atom of the chain of carbon atoms between the two nitrogen atoms; and
Z stands for the atoms which serve to complete a heterocyclic radical.

5. A photographic material comprising a silver halide emulsion containing a dyestuff serving to sensitize said silver halide emulsion corresponding with the formula

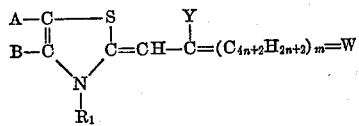

wherein

A and B stand for hydrogen, alkyl or the carbon atoms to complete an aromatic ring;

$R_1$ stands for a chlorophenyl radical;

$n$ stands for an integer selected from the group consisting of 0 and 1;

$m$ stands for an integer selected from the group consisting of 0, 1, 2 and 3;

Y stands for a member selected from the group consisting of hydrogen and alkyl;

W stands for a radical selected from the group consisting of

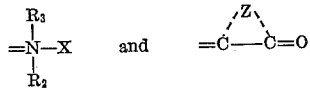

in which

X stands for an anion;

$R_2$ stands for a hydrocarbon radical;

$R_3$ stands for a member selected from the group consisting of hydrocarbon radicals, an atom chain including three atoms which serve to complete a 5-membered hetero ring with at least one carbon atom of the chain of carbon atoms between the two nitrogen atoms, and an atom chain including two or four atoms which serve to complete a 6-membered hetero ring with at least one carbon atom of the chain of carbon atoms between the two nitrogen atoms; and Z stands for the atoms which serve to complete a heterocyclic radical.

6. A photographic silver halide emulsion sensitized with a thiazolium cyanine dye having an aryl substituent on the N atom of the thiazole ring.

7. A photographic silver halide emulsion sensitized with a thiazolium cyanine dye having a phenyl substituent on the N atom of the thiazole ring.

8. A photographic silver halide emulsion sensitized with a thiazolium cyanine dye having a halogenated phenyl substituent on the N atom of the thiazole ring.

9. A photographic silver halide emulsion sensitized with a thiazolium cyanine dye having a chlorophenyl substituent on the N atom of the thiazole ring.

10. A photographic silver halide emulsion sensitized with a dye of the following structural formula:

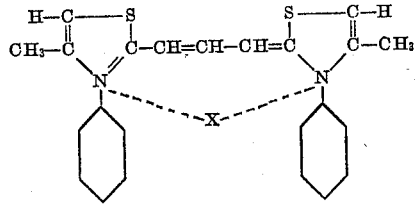

In which X stands for an anion.

11. A photographic silver halide emulsion sensitized with a dye of the following structural formula:

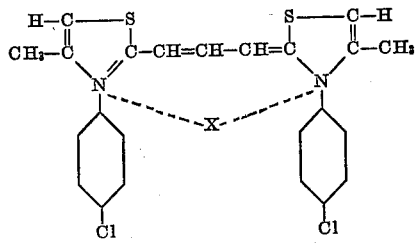

in which X stands for an anion.

12. A photographic gelatino-silver-halide emulsion sensitized with a dye selected from those represented by the following general formula:

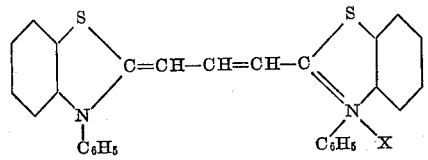

wherein X represents an acid radical.

13. A photographic gelatino-silver-halide emulsion sensitized with the dye of the following formula:

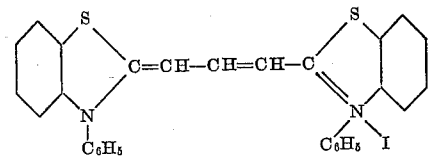

14. A photographic silver halide emulsion sensitized with a thiazolylidene merocyanine dye having an aryl substituent on the N-atom of the thiazolylidene ring.

15. A photographic silver halide emulsion sensitized with a thiazolylidene merocyanine dye having an aryl substituent on the N-atom of the thiazolylidene ring, the thiazolylidene radical comprising a simple thiazolylidene ring.

JACOB JOSEF JENNEN.
WALTER MICHAELIS.

REFERENCES CITED

The following references are of record in the file of this patent:

UNITED STATES PATENTS

| Number | Name | Date |
|---|---|---|
| 2,060,383 | Schneider | Nov. 10, 1936 |
| 2,196,162 | Muller et al. | Apr. 2, 1940 |
| 2,199,542 | Konig | May 7, 1940 |
| 2,233,511 | Brooker et al. | Mar. 4, 1941 |
| 2,289,300 | Wilmanns et al. | July 7, 1942 |
| 2,317,357 | Brooker et al. | Apr. 27, 1943 |
| 2,330,203 | Brooker et al. | Sept. 28, 1943 |

FOREIGN PATENTS

| Number | Country | Date |
|---|---|---|
| 505,979 | Great Britain | May 16, 1939 |

OTHER REFERENCES

Doja: "Chemical Reviews," Dec. 1932, pages 273–274.

Journal Chem. Soc., 1933, Part I, pages 189–191 (London).

Wall: "History of Three-Color Photography," publ. 1924 by Amer. Phot. Publ. Co., Boston, pages 211–214 and 217–219.